(12) United States Patent  (10) Patent No.: US 8,928,702 B2
Kamio  (45) Date of Patent: Jan. 6, 2015

(54) DISPLAY DEVICE HAVING A REDUCED NUMBER OF SIGNAL LINES

(75) Inventor: Tomomi Kamio, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 698 days.

(21) Appl. No.: 13/155,597

(22) Filed: Jun. 8, 2011

(65) Prior Publication Data

US 2011/0304655 A1     Dec. 15, 2011

(30) Foreign Application Priority Data

Jun. 10, 2010  (JP) ................................ 2010-133270

(51) Int. Cl.
G09G 3/36 (2006.01)
G09G 5/10 (2006.01)
H04M 1/02 (2006.01)

(52) U.S. Cl.
CPC ...... G09G 3/3659 (2013.01); *G09G 2300/0443* (2013.01); *G09G 2300/0804* (2013.01); *G09G 2310/0297* (2013.01); *H04M 1/0266* (2013.01)
USPC .......................................... 345/690; 345/89

(58) Field of Classification Search
CPC ....................................................... G09G 3/36
See application file for complete search history.

(56) References Cited

U.S. PATENT DOCUMENTS

| 5,151,689 | A | * | 9/1992 | Kabuto et al. ................. | 345/103 |
| 6,825,822 | B2 | * | 11/2004 | Lee ................................... | 345/87 |
| 7,982,219 | B2 | * | 7/2011 | Kuo et al. ........................ | 257/59 |
| 2007/0159444 | A1 | * | 7/2007 | Liu et al. ......................... | 345/100 |
| 2008/0180463 | A1 | * | 7/2008 | Ogura ............................. | 345/690 |
| 2008/0238817 | A1 | * | 10/2008 | Mamba et al. .................. | 345/55 |
| 2008/0284776 | A1 | * | 11/2008 | Hirayama ....................... | 345/214 |
| 2009/0140253 | A1 | * | 6/2009 | Kasahara ........................ | 257/59 |
| 2009/0295698 | A1 | | 12/2009 | Kamio | |
| 2010/0171769 | A1 | * | 7/2010 | Kamio et al. .................. | 345/690 |
| 2010/0302471 | A1 | * | 12/2010 | Kim et al. ....................... | 349/37 |

FOREIGN PATENT DOCUMENTS

JP     2010-19914 A     1/2010

* cited by examiner

*Primary Examiner* — Joseph Feild
*Assistant Examiner* — K. Kiyabu
(74) *Attorney, Agent, or Firm* — Holtz, Holtz, Goodman & Chick PC

(57) ABSTRACT

A display device includes first and second scanning lines, first and second signal lines, first to fourth thin-film transistors, and first to third pixel electrodes. The first and second signal lines are arranged to intersect with the first and second scanning lines. The first thin-film transistor is connected to the second scanning line and the first signal line. The first pixel electrode is connected to the first thin-film transistor. The second thin-film transistor is connected to the first scanning line and the first pixel electrode. The second pixel electrode is connected to the second thin-film transistor. The third thin-film transistor is connected to the first scanning line and the second pixel electrode. The third pixel electrode is connected to the third thin-film transistor. The fourth thin-film transistor is connected to the second scanning line, the third pixel electrode, and the second signal line.

18 Claims, 6 Drawing Sheets

DISPLAY DEVICE HAVING A REDUCED NUMBER OF SIGNAL LINES

CROSS-REFERENCE TO RELATED APPLICATIONS

This application is based upon and claims the benefit of priority from prior Japanese Patent Application No. 2010-133270, filed Jun. 10, 2010, the entire contents of which are incorporated herein by reference.

BACKGROUND OF THE INVENTION

1. Field of the Invention

The invention relates to an active-matrix display device.

2. Description of the Related Art

In an active-matrix display device such as a liquid crystal display device, an image is displayed by arranging display pixels in positions corresponding to intersections between a plurality of scanning lines arranged in a row direction of a display portion and a plurality of signal lines arranged in a column direction of the display portion and applying preset voltages to the display pixels. In the conventional display device, it is required to provide signal lines and scanning lines for the respective display pixels. Therefore, outputs of a signal-line drive device (source driver) that drives the signal lines corresponding in number to the number of signal lines are required and outputs of a scanning-line drive device (gate driver) that drives the scanning lines corresponding in number to the number of scanning lines are required.

As one of the proposals for reducing the number of signal lines, for example, the technique is disclosed in Jpn. Pat. Appln. KOKAI Publication No. 2010-19914. In Jpn. Pat. Appln. KOKAI Publication No. 2010-19914, a display pixel connected to a signal line via a thin-film transistor (TFT) is connected to a display pixel via a different TFT and each of the two TFTs is driven by means of a different scanning line. In Jpn. Pat. Appln. KOKAI Publication No. 2010-19914, the number of signal lines can be reduced to two thirds by utilizing the above configuration.

In Jpn. Pat. Appln. KOKAI Publication No. 2010-19914, a display pixel connected to a signal line via two TFTs and one display pixel is present. Parasitic capacitance is associated with the TFT and the display pixel is equivalently a capacitive load. Therefore, the display pixel connected to the signal line via the two TFTs and one display pixel has a larger capacitive load with respect to the signal line in comparison with a display pixel connected to a signal line via only one TFT. Therefore, the time constant of the display pixel connected to the signal line via the two TFTs and one display pixel tends to become larger in comparison with the display pixel connected to the signal line via only one TFT. As a result, it tends to take a longer time to write a display signal of a desired voltage level in the display pixel connected to the signal line via the two TFTs and one display pixel in comparison with the display pixel connected to the signal line via only one TFT.

BRIEF SUMMARY OF THE INVENTION

According to a first aspect of the invention, there is provided a display device comprising: a first scanning line arranged to extend in a preset direction; a second scanning line arranged to extend in the preset direction; a first signal line arranged to intersect with the first and second scanning lines; a second signal line arranged to intersect with the first and second scanning lines; a first thin-film transistor comprising a gate electrode connected to the second scanning line and one of source and drain electrodes connected to the first signal line; a first pixel electrode connected to the other one of the source and drain electrodes of the first thin-film transistor; a second thin-film transistor comprising a gate electrode connected to the first scanning line and one of source and drain electrodes connected to the first pixel electrode; a second pixel electrode connected to the other one of the source and drain electrodes of the second thin-film transistor; a third thin-film transistor comprising a gate electrode connected to the first scanning line and one of source and drain electrodes connected to the second pixel electrode; a third pixel electrode connected to the other one of the source and drain electrodes of the third thin-film transistor; a fourth thin-film transistor comprising a gate electrode connected to the second scanning line, one of source and drain electrodes connected to the third pixel electrode and the other one of the source and drain electrodes connected to the second signal line; and a drive circuit supplying (i) a grayscale signal to be held in the first pixel electrode to the first pixel electrode via the first signal line and the first thin-film transistor, (ii) a grayscale signal to be held in the third pixel electrode to the third pixel electrode via the second signal line and the fourth thin-film transistor, (iii) a grayscale signal to be held in the second pixel electrode to the second pixel electrode via the first signal line, the first thin-film transistor, the first pixel electrode, and the second thin-film transistor in this order, and (iv) a grayscale signal to be held in the second pixel electrode to the second pixel electrode via the second signal line, the fourth thin-film transistor, the third pixel electrode, and the third thin-film transistor in this order.

According to a second aspect of the invention, there is provided a display device comprising: two signal lines arranged adjacent to each other; three pixel electrodes arranged between the two signal lines; two scanning lines arranged to intersect with the two signal lines and arranged adjacent to each other to sandwich at least one of the three pixel electrodes therebetween; and four thin-film transistors each comprising gate electrode connected to one of the two scanning lines and one of source and drain electrodes connected to one of the three pixel electrodes, wherein the two signal lines are electrically connected to each other via the three pixel electrodes and four thin-film transistors at a preset timing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described embodiments of this invention with reference to the drawings.

First Embodiment

Figure 1:
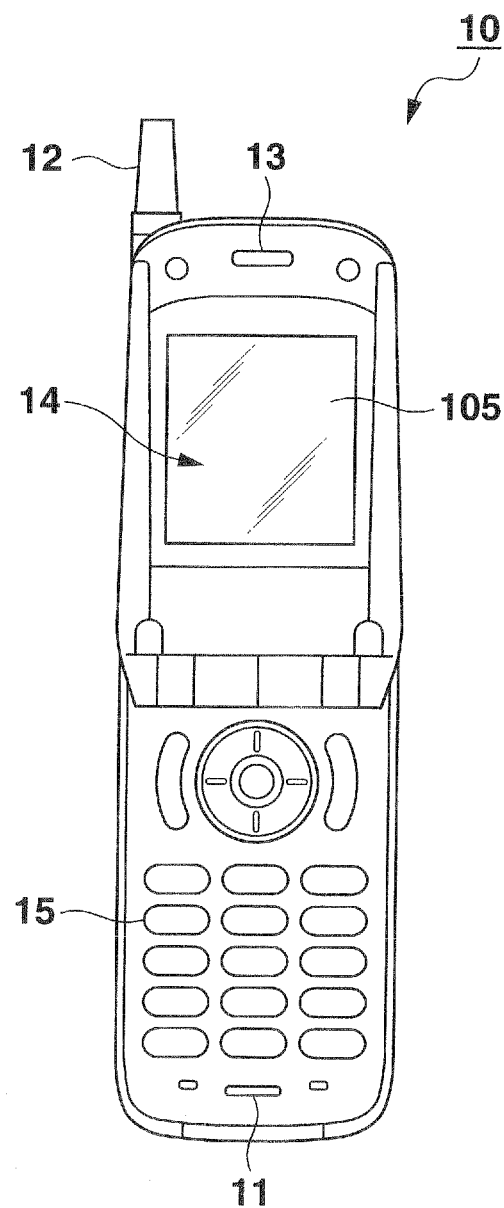
FIG. 1 is a view showing the appearance of a mobile phone as one example of an electronic device including a display device according to one embodiment of this invention.

First, a first embodiment of this invention is explained. FIG. 1 is a view showing the appearance of a mobile phone as one example of an electronic device including a display device according to each embodiment of this invention. The mobile phone 10 shown in FIG. 1 includes a microphone 11, antenna 12, speaker 13, liquid crystal display device 14 and operation unit 15.

The microphone 11 converts a voice input by the user of the mobile phone 10 into an electrical signal. The antenna 12 is an antenna used for communication with a base station (not shown). The speaker 13 converts an audio signal received by the antenna 12 from a different mobile phone or the like via the base station to a voice and outputs the same. The liquid crystal display device 14 displays various types of images. The operation unit 15 is used for operating by the user of the mobile phone 10.

Figure 2:
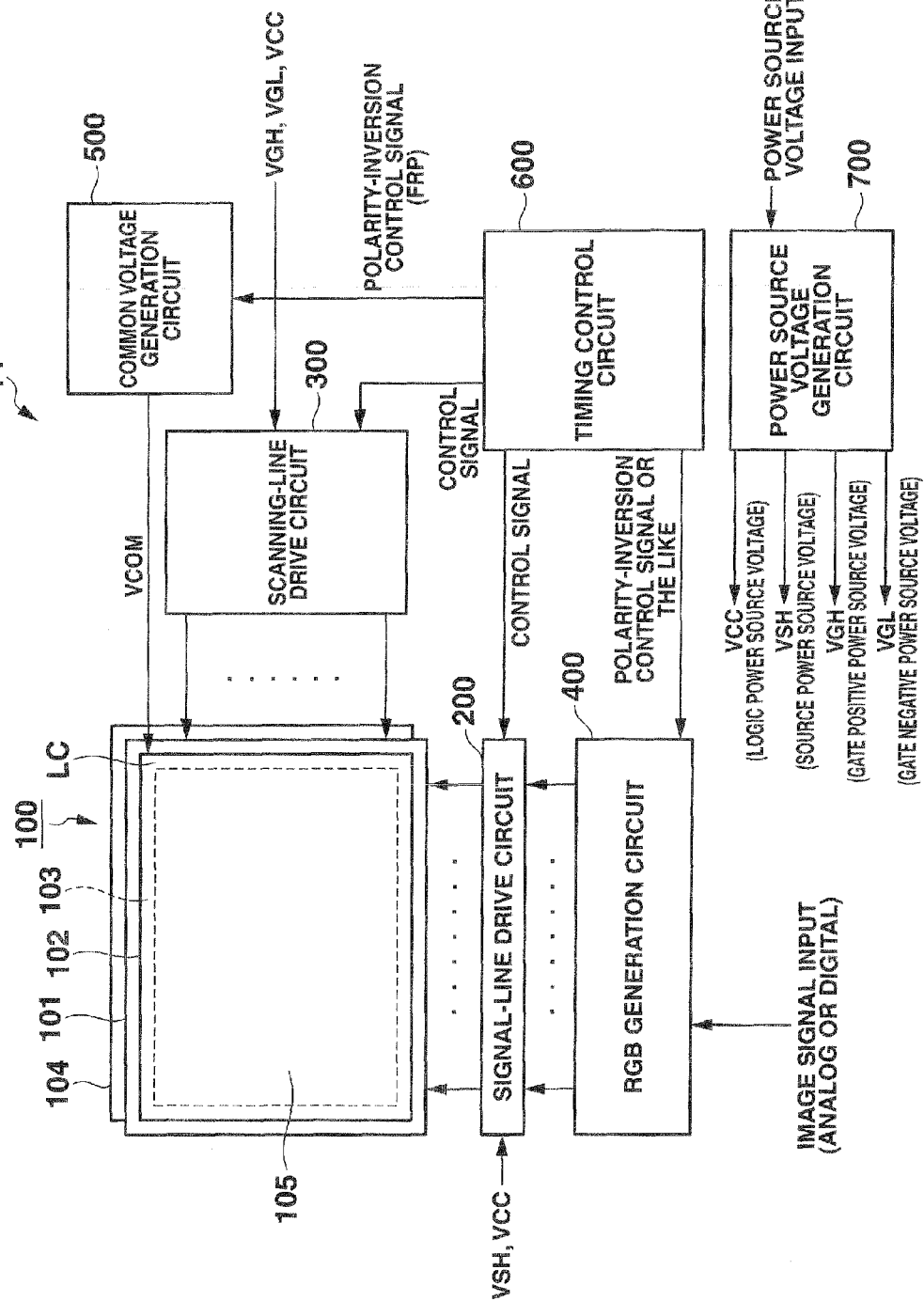
FIG. 2 is a diagram showing the whole configuration of a liquid crystal display device used as an example of the display device.

FIG. 2 is a diagram showing the whole configuration of the liquid crystal display device 14 used as an example of the display device according to each embodiment of this invention. The liquid crystal display device 14 shown in FIG. 1 includes a display panel 100, signal-line drive circuit 200, scanning-line drive circuit 300, RGB generation circuit 400, common voltage generation circuit 500, timing control circuit 600 and power source voltage generation circuit 700.

The display panel 100 causes an image based on an image signal (analog or digital) supplied from the exterior of the liquid crystal display device 14 to be displayed in a display region 105. In the display region 105, a plurality of display pixels 16 are arranged. In the display region 100, liquid crystal LC is disposed between first substrate 101 and second substrate 102.

The liquid crystal display device 14 is incorporated in a casing of the mobile phone 10 to make the display region 105 of she display panel 100 visible from the exterior. Further, the liquid crystal display device 14 is incorporated in the casing of the mobile phone 10 to arrange the second substrate 102 on the outer side. Additionally, a backlight 104 is provided on the backside of the display panel 100 (on the side adjacent to the first substrate 101).

On the first substrate 101 of the display panel 100, a plurality of scanning lines 17, a plurality of signal lines 18 and a plurality of pixel electrodes 19 are arranged. The pixel electrode 19 is configured by a transparent conductive film of indium tin oxide (ITO) or the like, for example.

Further, the second substrate 102 of the display panel 100 is arranged to face the first substrate 101. An opposite electrode is formed on the second substrate 102. The opposite electrode is supplied with common voltage VCOM from the common voltage generation circuit 500.

The first substrate 101 and second substrate 102 are adhered to each other by means of a frame-form seal member 103. In a region surrounded by the seal member 103, liquid crystal LC is sealed without leaking from between the first substrate 101 and second substrate 102.

With the above structure, one display pixel 16 is configured by the pixel electrode 19 formed on the first substrate 101, liquid crystal LC disposed between the first substrate 101 and second substrates 102 and the opposite electrode formed on the second substrate 102. The display pixels 16 are arranged in a matrix form by arranging the pixel electrode 19 in a matrix form. Further, an auxiliary capacitor is connected in parallel with each display pixel 16. Grayscale signal Vsig is written into the pixel electrode 19 of the splay pixel 16 by means of the signal-line drive circuit 200. Therefore, voltage VLCD corresponding to a difference between common voltage VCOM and pixel electrode voltage Vpix based on grayscale signal Vsig is applied to liquid crystal LC disposed between the pixel electrode 19 and the opposite electrode. The light-transmittance characteristic of the liquid crystal is changed according to an applied voltage. Therefore, an image can be displayed with desired grayscale levels (luminance) on the display pixels 16 by controlling the transmittance of the liquid crystal while applying light from the backlight 104 provided on the backside of the display panel 100 to the respective display pixels 16 of the display panel 100. Further, voltage VLCD written in liquid crystal LC is held by the auxiliary capacitor until grayscale signal Vsig is written in the pixel electrode 19 again.

Figure 3:
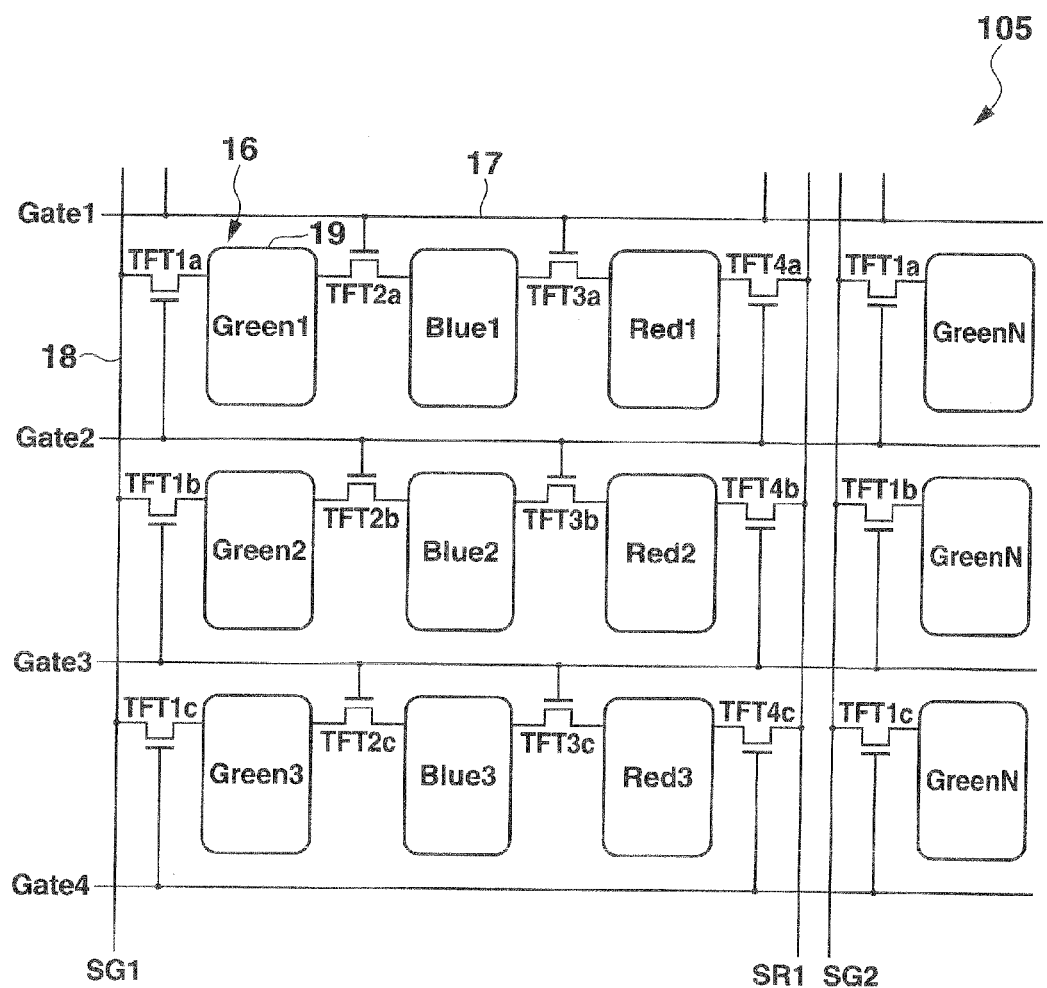
FIG. 3 is a diagram showing the connection structure of pixel electrodes arranged in the display region of a display panel in a first embodiment of this invention.

FIG. 3 is a diagram showing the connection structure of the pixel electrodes 19 (display pixels 16) arranged in the display region 105 of the display panel 100 in the first embodiment. FIG. 3 mainly shows the connection structure of the display pixels 16 of nine pixels in the display region 105. However, the number of display pixels 16 is not limited to nine. The display pixels 16 arranged in a region other than the region of the display region 105 shown in FIG. 3 has the same connection structure as that shown in FIG. 3. Further, FIG. 3 shows an example in which the display panel 100 can provide a color display. In other words, a color filter of one of red (Red), green (Green) and blue (Blue) is arranged in front of each pixel electrode 19. In FIG. 3, the pixel electrodes 19 can be identified by setting the pixel electrode 19 related to a green display as GreenN (N=1, 2, 3 in FIG. 3), the pixel electrode 19 related to a red display as RedN (N=1, 2, 3 in FIG. 3) and the pixel electrode 19 related to a blue display as BlueN (N=1, 2, 3). As shown in FIG. 3, in this embodiment, color filters are arranged in a stripe form so that the display pixels 16 may repeatedly be arranged in a row direction (in the extending direction of the scanning lines 17) in an order of green (Green), blue (Blue) and red (red), for example, and the display elements 16 arranged in a column direction (in the extending direction of the signal lines) may have the same color components.

Further, as shown in FIG. 3, four scanning lines 17 are shown and the respective scanning lines 17 are shown to be identified as GateN (N=1, 2, 3, 4). Likewise, as shown in FIG. 3, three signal lines 18 are shown and the respective signal lines 18 are shown to be identified as SGN (N=1, 2 in FIG. 3) and SRN (N=1 in FIG. 3). In this embodiment, signal lines SGN function as first signal lines and signal lines SRN function as second signal lines.

In this embodiment, as shown in FIG. 3, scanning lines Gate1, Gate2, Gate3, Gate4 and signal lines SG1, SR1, SG2 are arranged to intersect with one another.

Further, pixel electrodes Green1, Green2 and Green3 are arranged in positions corresponding to the intersections between scanning lines Gate1, Gate2, Gate3 and signal line SG1. Pixel electrodes Green1, Green2 and Green3 are respectively connected to the scanning lines (second scanning lines) each lying on the lower one of the rows corresponding to two scanning lines arranged to sandwich the pixel electrode via first thin-film transistors TFT1a, TFT1b and TFT1c. Further, pixel electrodes Green1, Green2 and Green3 are also connected to signal line SG1 via first thin-film transistors TFT1a, TFT1b, TFT1c, respectively.

More specifically, pixel electrodes Green1, Green2 and Green3 are respectively connected to the drain electrodes (or source electrodes) of TFT1a, TFT1b and TFT1c. Further, the source electrodes (or drain electrodes) of TFT1a, TFT1b and TFT1c are each connected to signal line SG1. Additionally, the gate electrodes of TFT1a, TFT1b and TFT1c are respectively connected to scanning lines Gate2, Gate3 and Gate4.

Further, pixel electrodes Green1, Green2 and Green3 are respectively connected to second thin-film transistors TFT2a, TFT2b and TFT2c. More specifically, pixel electrodes Green1, Green2 and Green3 are respectively connected to the source electrodes (or drain electrodes) of TFT2a, TFT2b and TFT2c. Further, the drain electrodes (or source electrodes) of TFT2a, TFT2b and TFT2c are connected to pixel electrodes Blue1, Blue2 and Blue3. Additionally, the gate electrodes of TFT2a, TFT2b and TFT2c are respectively connected to the scanning lines (first scanning lines) each lying on the upper one of the rows corresponding to two scanning lines arranged to sandwich pixel electrodes GreenN and BlueN connected to the corresponding TFT. That is, the gate electrodes of TFT2a, TFT2b and TFT2c are respectively connected to scanning lines Gate1, Gate2 and Gate3.

Further, pixel electrodes Blue1, Blue2 and Blue3 are respectively connected to third thin-film transistors TFT3a, TFT3b and TFT3c. More specifically, pixel electrodes Blue1, Blue2 and Blue3 are respectively connected to the source electrodes (or drain electrodes) of TFT3a, TFT3b and TFT3c. Further, the drain electrodes (or source electrodes) of TFT3a, TFT3b and TFT3c are connected to pixel electrodes Red1, Red2 and Red3. Additionally, the gate electrodes of TFT3a, TFT3b and TFT3c are respectively connected to the scanning lines (first scanning lines) each lying on the upper one of the rows corresponding to two scanning lines arranged to sandwich pixel electrodes BlueN and RedN connected to the corresponding TFT. That is, the gate electrodes of TFT3a, TFT3b and TFT3c are respectively connected to scanning lines Gate1, Gate2 and Gate3.

Further, pixel electrodes Red1, Red2 and Red3 are respectively connected to fourth thin-film transistors TFT4a, TFT4b and TFT4c. More specifically, pixel electrodes Red1, Red2 and Red3 are respectively connected to the source electrodes (or drain electrodes) of TFT4a, TFT4b and TFT4c. Further, the drain electrodes (or source electrodes) of TFT4a, TFT4b and TFT4c are connected to signal line SR1. Additionally, the gate electrodes of TFT4a, TFT4b and TFT4c are respectively connected to the scanning lines (second scanning lines) each lying on the lower one of the rows corresponding to two scanning lines arranged to sandwich pixel electrode RedN connected to the corresponding TFT. That is, the gate electrodes of TFT4a, TFT4b and TFT4c are respectively connected to scanning lines Gate2, Gate3 and Gate4.

In this embodiment, as shown in FIG. 3, pixel electrodes GreenN, BlueN and RedN that are arranged adjacent to one another and sandwiched between the first and second scanning lines arranged in parallel respectively function as first, second and third pixel electrodes. Pixel electrodes RedN related to a red display and pixel electrodes GreenN related to a green display among pixel electrodes GreenN, BlueN and RedN that are arranged adjacent to one another and sandwiched between the two scanning lines are directly connected to the signal lines via the TFTs. Further, each pixel electrode BlueN related to a blue display is not directly connected to the signal line via the TFT and is indirectly connected to the signal line via pixel electrode RedN or GreenN. With the connection structure of the display pixels as shown in FIG. 3, the number of signal lines can be reduced to two thirds of the number of display pixels of one row.

The signal-line drive circuit 200 in FIG. 2 is connected to the signal lines 18 shown in FIG. 3, fetches image data of each row unit corresponding to the respective colors of R, G and B supplied from the RGB generation circuit 400 according to a control signal (vertical sync signal, horizontal sync signal or the like) from the timing control circuit 600 and supplies grayscale signals corresponding to the fetched image data to the corresponding signal lines 18.

The scanning-line drive circuit 300 is connected to the scanning lines 17 shown in FIG. 3 and sets a scanning signal supplied to the TFTs connected to the scanning line to gate-on level VGH or gate-off level VGL according to a control signal (vertical sync signal, horizontal sync signal or the like) from the timing control circuit 600.

For example, the RGB generation circuit 400 generates image data corresponding to the respective colors of R, G and B based on an image signal (analog or digital) supplied from the exterior of the liquid crystal display device and outputs the same to the signal-line drive circuit 200. In this case, polarity-inversion control signal (FRP) is input to the RGB generation circuit 400 from the timing control circuit 600 for each preset period (for example, for each vertical period or each horizontal period). The RGB generation circuit 400 inverts a bit value of image data output to the signal-line drive circuit 200 each time the polarity-inversion control signal is input. The polarity of the grayscale signal supplied to the pixel electrode is inverted for each preset period by thus inverting the bit value of image data for each preset period. As a result, the display pixels can be AC-driven.

The common voltage generation circuit 500 is designed to generate two types of common voltages VCOM including positive common voltage VCOM+ whose voltage level is higher than a grayscale signal and negative common voltage VCOM− whose voltage level is lower than the grayscale signal. The circuit 500 selects one of positive common voltage VCOM+ and negative common voltage VCOM− according to the polarity-inversion control signal from the timing control circuit 600 and supplies the selected voltage to the opposite electrode formed on the second substrate 102.

The timing control circuit 600 generates various types of control signals such as a vertical control signal, horizontal control signal and polarity-inversion control signal and supplies the same to the respective blocks.

The power source voltage generation circuit 700 generates power source voltage VSH required for generating a grayscale signal and supplies the same to the signal-line drive circuit 200 and generates power source voltages VGH and VGL required for generating a scanning signal and supplies the same to the scanning-line drive circuit 300. Further, the power source voltage generation circuit 700 generates logic power source voltage VCC and supplies the same to the signal-line drive circuit 200 and scanning-line drive circuit 300.

Figure 4:
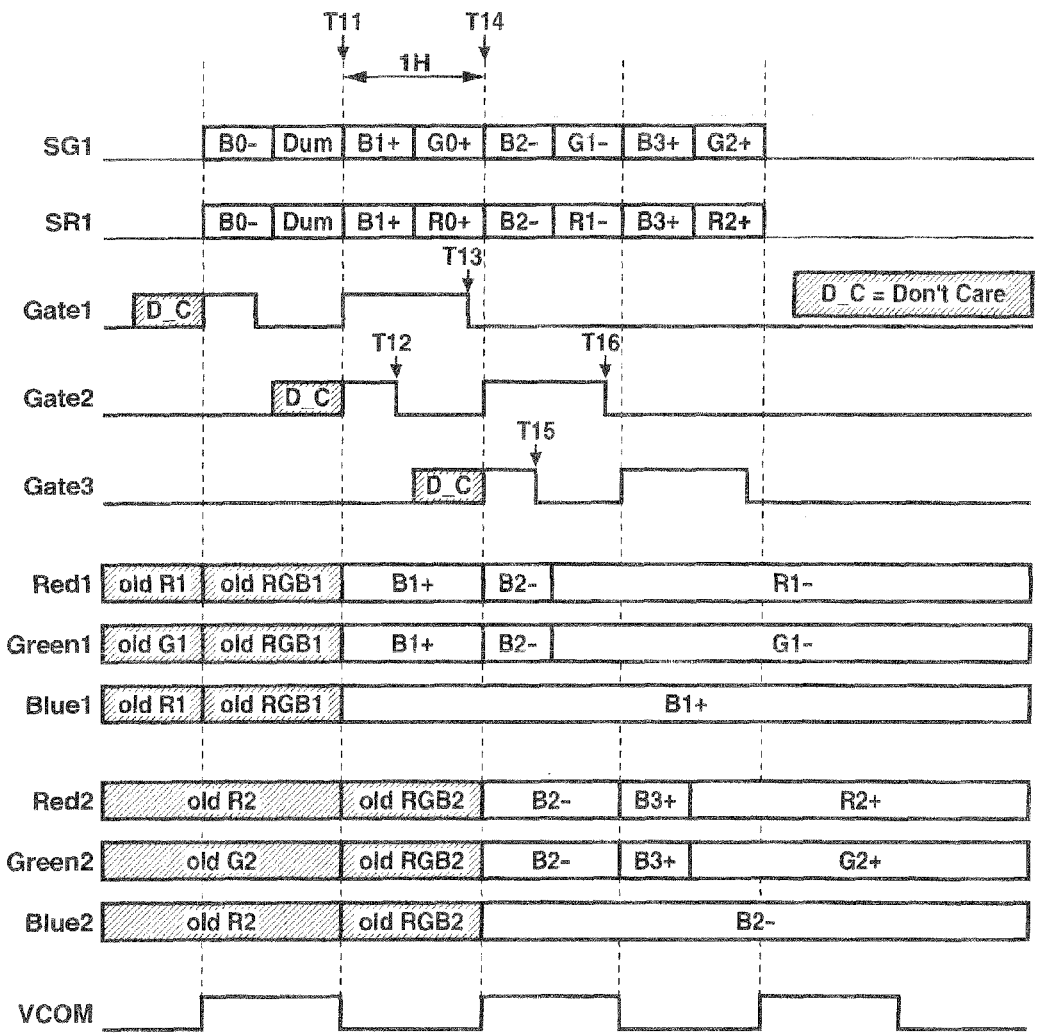
FIG. 4 is a timing chart for illustrating the display operation of the display device in the first embodiment of this invention.

Next, the operation of the display device according to this embodiment is explained. FIG. 4 is a timing chart for illustrating the display operation of the display device in this embodiment. In FIG. 4, a grayscale signal supplied to signal line SG1, a grayscale signal supplied to signal line SR1, scanning signal supplied to scanning line Gate1, a scanning signal supplied to scanning line Gate2, a scanning signal supplied to scanning line Gate3, a voltage-application state in pixel electrode Red1, a voltage-application state in pixel electrode Green1, a voltage-application state in pixel electrode Blue1, a voltage-application state in pixel electrode Red2, a voltage-application state in pixel electrode Green2, a voltage-application state in pixel electrode Blue2 and common voltage VCOM supplied to the opposite electrode are shown in this order from the top.

In this embodiment, image data is input to the signal-line drive circuit 200 for each half horizontal period (H) in an order of blue, green, blue, green, . . . for signal lines SGN that are the signal lines 18 of odd-numbered columns.

Further, image data is input to the signal-line drive circuit 200 for each half horizontal period (H) in an order of blue, red, blue, red, . . . for signal lines SRN that are the signal lines 18 of even-numbered columns. However, image data related to a green display and image data related to a red display are input with a delay of 1.5 horizontal period with respect to image data related to a blue display. The bit value of image data is inverted for each horizontal period. In FIG. 4, a symbol of "+" is appended to a grayscale signal obtained when the bit inversion of image data is not executed and a symbol of "−" is appended to a grayscale signal obtained when the bit inversion of image data is made. As shown in FIG. 4, the polarity of common voltage VCOM is also inverted for each horizontal period along with inversion of the polarity of the grayscale signal.

As described above, as shown in FIG. 4, grayscale signals B0−, Dum, B1+, G0+, B2−, G1−, B3+, . . . are supplied to signal line SG1 and grayscale signals B0−, Dum, B1+, R0+, B2−, R1−, B3+, . . . are supplied to signal line SR1. "Dum" indicates a dummy grayscale signal. As dummy grayscale signal Dum, desired data can be input. Further, B0−, G0+ and R0+ indicate grayscale signals supplied to pixel electrodes connected to a scanning line on an upper row with respect to scanning line Gate1. Therefore, when scanning line Gate1 is the first (for example, uppermost) row configuring the display panel 100, a grayscale signal may be supplied to signal line SG1 starting from B1+ and a grayscale signal may be supplied to signal line SR1 starting from B1+.

In the following explanation, a display in display pixels corresponding to pixel electrodes Green1, Blue1 and Red1 connected to scanning line Gate1 and pixel electrodes Green2, Blue2 and Red2 connected to scanning line Gate2 is explained. The same control operation as that explained below is performed for the pixel electrodes of the other rows. The explanation for periods corresponding to grayscale signals R0, G0 and B0 shown in FIG. 4 is omitted since the periods relate to a display for rows lying above scanning line Gate1.

In this embodiment, a scanning signal supplied to each scanning line is set to gate-on level VGH twice in each vertical period (each frame). First, a scanning signal supplied to scanning line Gate1 and a scanning signal supplied to scanning line Gate2 are set at gate-on level VGH for respective preset periods. The period in which the scanning signal supplied to scanning line Gate1 is kept at gate-on level VGH is set to a period from the time when supply of grayscale signal B1+ corresponding to display pixel Blue1 has started to the time immediately before supply of grayscale signal G0+ is ended. Further, the period in which the scanning signal supplied to scanning line Gate2 is kept at gate-on level VGH is set to a period from the time when supply of grayscale signal B1+ corresponding to display pixel Blue1 has started to the time immediately before supply of grayscale signal B1+ is ended. The periods in which the scanning signals supplied to scanning lines Gate1 and Gate2 are kept set at gate-on level VGH may start from the times earlier than the above times by a half horizontal period. In FIG. 4, the period is indicated by D_C.

TFT2a and TFT3a are turned on by setting the scanning signal supplied to scanning line Gate1 to gate-on level VGH at time T11. Further, TFT1a, TFT4a, TFT2b and TFT3b are turned on by setting the scanning signal supplied to scanning line Gate2 to gate-on level VGH at time T11. As a result, both of grayscale signal B1+ supplied to signal line SG1 and grayscale signal B1+ supplied to signal line SR1 are written in pixel electrodes Green1, Blue1 and Red1. Then, a display corresponding to grayscale signal B1+ is made in the display pixels 16 corresponding to pixel electrodes Green1, Blue1 and Red1.

That is, signal lines SON and SRN are electrically conductive to each other in a period from time T11 to time T12 that will be described later.

Each grayscale signal to be written is grayscale signal B1+ corresponding to pixel electrode Blue1, but the actual display is made via color filter. Therefore, even if grayscale signal B1+ has been written, a green display is made in the display pixel 16 corresponding to pixel electrode Green1 and a red display is made in the display pixel 16 corresponding to pixel electrode Red1. Further, although the detailed explanation is made later, the voltage-application states of pixel electrodes Green1 and Red1 become an adequate state 1.5 horizontal period after the start of the write operation of grayscale signal B1+. Therefore, there occurs no substantial problem in display in the display pixels corresponding to the above pixel electrodes.

In this case, the scanning signal supplied to scanning line Gate3 is kept at gate-off level VOL. Therefore, even if TFT2b and TFT3b are set in the on state, TFT1b and TFT4b are set in the off state. As a result, grayscale signal. B1+ supplied to signal line SG1 and grayscale signal. B1+ supplied to signal line SR1 are not written in pixel electrodes Green2, Blue2 and Red2. A path between pixel electrode Green2 and Blue2 becomes conductive via TFT2b and a path between pixel electrode Blue2 and Red2 becomes conductive via TFT3b. Therefore, the voltage levels of pixel electrodes Green2, Blue2 and Red2 are averaged together with voltages that have been applied to pixel electrodes Green2, Blue2 and Red2 in the preceding frame (and that are voltages held in the auxiliary capacitors and indicated as oldR2, oldG2 and oldB2 in FIG. 4). In FIG. 4, the averaged voltage is shown as oldRGB2. Further, in FIG. 4, oldR1, oldG1 and oldB1 are also shown. The voltages indicate voltages held in pixel electrodes Red1, Green1 and Blue1 in the preceding frame.

When the scanning signal supplied to scanning line Gate2 is set to gate-off level VGL at time T12 while the scanning signal supplied to scanning line Gate1 is kept at gate-on level VGH, TFT2a and TFT3a are turned on to synthesize (average) voltages of pixel electrodes Green1, Blue1 and Red1. However, in this case, since grayscale signal B1+ corresponding to pixel electrode Blue1 is supplied to display pixels Green1, Blue1 and Red1 in the immediately preceding half horizontal period, voltages of pixel electrodes Green1, Blue1 and Red1 are kept set at the voltage corresponding to grayscale signal B1+ even after the voltages are averaged. Further, the voltages of pixel electrodes Green2, Blue2 and Red2 are held in the auxiliary capacitors until the TFTs connected to pixel electrodes Green2, Blue2 and Red2 are turned on again.

When the scanning signal supplied to scanning line Gate1 is set to gate-off level VGL at time T13, the voltages of pixel electrodes Green1, Blue1 and Red1 are held in the auxiliary capacitors until the TFTs connected to pixel electrodes Green1, Blue1 and Red1 are turned on again.

In the next horizontal period, the scanning signal supplied to scanning line Gate2 and the scanning signal supplied to scanning line Gate3 are set at gate-on level VGH for preset periods, respectively. In this case, the period in which the scanning signal supplied to scanning line Gate2 is kept set at gate-on level VGH is set to a period from the time when supply of grayscale signal B2− corresponding to pixel electrode Blue2 has started to the time immediately before supply of grayscale signal G1− corresponding to pixel electrode Green1 and grayscale signal R1− corresponding to pixel electrode Red1 is ended. Further, the period in which the scanning signal supplied to scanning line Gate3 is kept set at gate-on level VGH is set to a period from the time when supply of grayscale signal B2− corresponding to pixel electrode Blue2 has started to the time immediately before supply of grayscale signal B2− is ended.

As described above, TFT2b and TFT3b are turned on by setting the scanning signal supplied to scanning line Gate2 to gate-on level VGH at time 114. Further, TFT1b and TFT4b are turned on by setting the scanning signal supplied to scanning line Gate3 to gate-on level VGH at time T14. As a result, grayscale signal B2− supplied to signal line SG1 is written in pixel electrodes Green1, Green2, Blue2 and Red2. Further, grayscale signal B2− supplied to signal line SR1 is written in pixel electrodes Red1, Green2, Blue2 and Red2. Then, a display corresponding to grayscale signal B2− is made in the display pixels 16 corresponding to pixel electrodes Green1, Red1, Green2, Red2 and Blue2. Since both of TFT2a and TFT3a are set in the off state, the grayscale signal is not written in pixel electrode Blue1 at this time. Further, since the scanning signal supplied to scanning line Gate4 is kept set at gate-off level VGL, TFT1c and TFT4c are set in the off state even if TFT2c and TFT3c are set in the on state. Therefore, grayscale signal B2− supplied to signal line SG1 and grayscale signal B2− supplied to signal line SR1 are not written in pixel electrodes Green3, Blue3 and Red3. Instead of this, the voltages are synthesized (averaged) as described before in pixel electrodes Green3, Blue3 and Red3.

When the scanning signal supplied to scanning line Gate3 is set to gate-off level VGL at time T15 while the scanning signal supplied to scanning line Gate2 is kept at gate-on level VGH, TFT1a is turned on. Therefore, grayscale signal G1− corresponding to pixel electrode Green1 and supplied to signal line SG1 is written in pixel electrode Green1. As a result, the voltage-application state of grayscale signal B2− corresponding to pixel electrode Blue2 in pixel electrode Green1 is canceled and an adequate display is made in the display pixel 16 corresponding to pixel electrode Green1. Likewise, TFT4a is turned on and grayscale signal R1− corresponding to pixel electrode Red1 and supplied to signal line SR1 is written in pixel electrode Red1. As a result, the voltage-application state of grayscale signal B2− corresponding to pixel electrode Blue2 in pixel electrode Red1 is canceled and an adequate display is made in the display pixel 16 corresponding to pixel electrode Red1. In this case, since TFT2a and TFT3a are set in the off state even if TFT1a and TFT4a are set in the on state, no grayscale signal is written in pixel electrode Blue1 at this time.

As described above, an adequate grayscale display corresponding to an image signal is made in the display pixels 16 corresponding to pixel electrodes Red1, Green1 and Blue1. In this embodiment, an adequate display is made in the display pixels 16 corresponding to pixel electrodes Red1 and Green1 with a delay of 1.5 horizontal period with respect to a display in the display pixel 16 corresponding to pixel electrode Blue1.

Further, when the scanning signal supplied to scanning line Gate3 is set to gate-off level VGL at time T15 while the scanning signal supplied to scanning line Gate2 is kept at gate-on level VGH, TFT2b and TFT3b are turned on to synthesize (average) the voltages. However, since grayscale signal B2− is supplied to display pixels Green2, Blue2 and Red2 in the immediately preceding half horizontal period, the voltages of pixel electrodes Green2, Blue2 and Red2 are kept set at the voltage corresponding to grayscale signal B2− even after the voltages are synthesized. Further, the voltages of pixel electrodes Green3, Blue3 and Red3 are held in the auxiliary capacitors until the TFTs connected to pixel electrodes Green3, Blue3 and Red3 are turned on again.

When the scanning signal supplied to scanning line Gate2 is set to gate-off level VGL at time T16, the voltages of pixel electrodes Green2, Blue2 and Red2 are held in the auxiliary capacitors until the TFTs connected to pixel electrodes Green2, Blue2 and Red2 are turned on again.

Further, although not shown in FIG. 4, in the next horizontal period, when the scanning signal supplied to scanning line Gate4 is set to gate-off level VGL while the scanning signal supplied to scanning line Gate3 is kept at gate-on level VGH, grayscale signal G2+ that has been supplied to signal line SG1 is written in pixel electrode Green2 and grayscale signal R2+ that has been supplied to signal line SR1 is written in pixel electrode Red2 as described above. Thus, an adequate grayscale display to be made according to an image signal is made in the display pixels 16 corresponding to pixel electrodes Red2, Green2 and Blue2.

The same control operation as described above is performed in the succeeding horizontal period and an adequate grayscale display is made based on an image signal in each display pixel.

As described above, in this embodiment, pixel electrode RedN related to the red display and pixel electrode GreenN related to the green display are directly connected to the respective signal lines via the TFTs. Further, pixel electrode BlueN related to the blue display is indirectly connected to the signal line via pixel electrode RedN or GreenN. With the above connection structure of the display pixels, the number of signal lines can be reduced to two thirds of the number of display pixels of one row.

Further, as shown in FIG. 3, two TFTs and one pixel electrode are provided between pixel electrode BlueN and the signal line. In this embodiment, grayscale signals are written into pixel electrode BlueN via both of two signal lines arranged to sandwich pixel electrode BlueN. Therefore, the time constant in pixel electrode BlueN is reduced to reduce a period until the operation of writing a grayscale signal at a desired level into pixel electrode BlueN is completed.

Second Embodiment

Next, a second embodiment of this invention is explained. In the second embodiment, the whole configuration of a liquid crystal display device is the same as that of the first embodiment. In the second embodiment, the connection structure of pixel electrodes (display pixels) arranged in a display region of a display panel 100 and the operation of the liquid crystal display device caused by the above structure are different.

In the following explanation, the explanation is made with much attention paid to a point different from that of the first embodiment.

Figure 5:
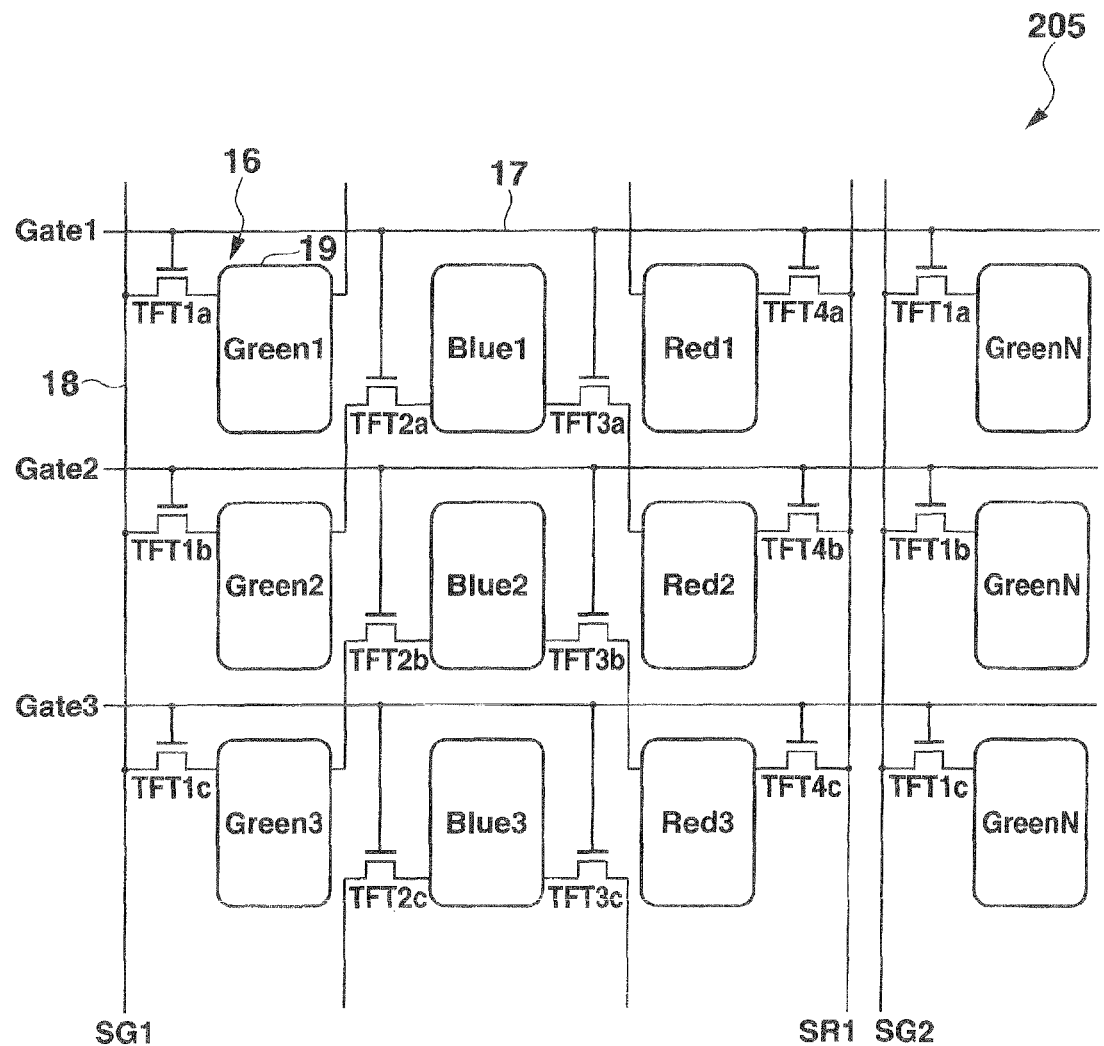
FIG. 5 is a diagram showing the connection structure of pixel electrodes arranged in the display region of a display panel in a second embodiment of this invention.

FIG. 5 is a diagram showing the connection structure of the pixel electrodes 19 (display pixels 16) arranged in a display region 203 of the display panel 100 is this embodiment. In FIG. 5, the connection structure of the display pixels 16 of nine pixels in the display region 205 is mainly shown. Further, in FIG. 5, three scanning lines 17 are shown and the scanning lines 17 are indicated as GateN (N=1, 2, 3). Likewise, in FIG. 5, three signal lines 18 are shown and the signal lines are indicated as SGN (N=1, 2 in FIG. 5) and SRN (N=1 in FIG. 5). In this embodiment, signal lines SGN function as first signal lines and signal lines SRN function as second signal lines.

Also, in FIG. 5, scanning lines Gate1, Gate2, Gate3 and signal lines SG1, SR1, SG2 are arranged to intersect with one another.

Further, pixel electrodes Green1, Green2 and Green3 are arranged in positions corresponding to intersections between scanning lines Gate1, Gate2, Gate3 and signal line SG1. Pixel electrodes Green1, Green2 and Green3 are respectively connected to the scanning lines (second scanning lines) each lying on the lower one of the rows corresponding to two scanning lines arranged to sandwich the pixel electrodes (in FIG. 5, none of pixel electrodes lying above the row of Green1 is shown) lying above the row of pixel electrodes GreenN via first thin-film transistors TFT1a, TFT1b and TFT1c. Further, pixel electrodes Green1, Green2 and Green3 are also connected to signal line SG1 via first thin-film transistors TFT1a, TFT1b and TFT1c, respectively. More specifically, pixel electrodes Green1, Green2 and Green3 are respectively connected to the drain electrodes (or source electrodes) of TFT1a, TFT1b and TFT1c. Further, the source electrodes (or drain electrodes) of TFT1a, TFT1b and TFT1c are each connected to signal line SG1. Additionally, the gate electrodes of TFT1a, TFT1b and TFT1c are respectively connected to scanning lines Gate1, Gate2 and Gate3.

Further, pixel electrodes Green2 and Green3 are also connected to second thin-film transistors TFT2a and TFT2b. More specifically, the source electrodes (or drain electrodes) of TFT2a and TFT2b are arranged to extend over scanning lines Gate2 and Gate3 and connected to pixel electrodes Green2 and Green3. When pixel electrodes are provided on the row above Green1, Green1 is also connected to the source electrode of a second thin-film transistor. Further, the drain electrodes (or source electrodes) of TFT2a, TFT2b and TFT2c are connected to pixel electrodes Blue1, Blue2 and Blue3. Additionally, the gate electrodes of TFT2a, TFT2b and TFT2c are respectively connected to the scanning lines (first scanning lines) each lying on the upper one of the rows corresponding to two scanning lines arranged to sandwich pixel electrode BlueN connected to the respective TFT That is, the gate electrodes of TFT2a, TFT2b and TFT2c are respectively connected to scanning lines Gate1, Gate2 and Gate3.

Further, pixel electrodes Blue1, Blue2 and Blue3 are also connected to third thin-film transistors TFT3a, TFT3b and TFT3c. More specifically, pixel electrodes Blue1, Blue2 and Blue3 are connected to the source electrodes (or drain electrodes) of TFT3a, TFT3b and TFT3c. The drain electrodes (or source electrodes) of TFT3a and TFT3b are arranged to extend over scanning lines Gate2 and Gate3 and connected to pixel electrodes Red2 and Red3. When pixel electrodes are provided on the row above Red1, Red1 is also connected to the drain electrode of a third thin-film transistor. Further, the gate electrodes of TFT3a, TFT3b and TFT3c are respectively connected to the scanning lines (first scanning lines) each lying on the upper one of the rows corresponding to two scanning lines arranged to sandwich pixel electrode BlueN connected to the respective TFT. That is, the gate electrodes of TFT3a, TFT3b and TFT3c are respectively connected to scanning lines Gate1, Gate2 and Gate3.

Pixel electrodes Red1, Red2 and Red3 are respectively connected to fourth thin-film transistors TFT4a, TFT4b and TFT4c. More specifically, pixel electrodes Red1, Red2 and Red3 are also connected to the source electrodes (or drain electrodes) of TFT4a, TFT4b and TFT4c. The drain electrodes (or source electrodes) of TFT4a, TFT 4h and TFT4c are connected to signal line SR1. Further, the gate electrodes of TFT4a, TFT4b and TFT4c are connected to the scanning lines (second scanning lines) each lying on the lower one of the rows corresponding to two scanning lines arranged to sandwich the pixel electrodes (in FIG. 5, none of pixel electrodes lying above the row of Red1 is shown) lying above the row of pixel electrodes RedN.

As shown in FIG. 5, in this embodiment, pixel electrodes BlueN arranged between the first and second scanning lines arranged in parallel function as second pixel electrodes. Further, pixel electrodes GreenN and RedN arranged to sandwich the second scanning lines in cooperation with pixel electrodes BlueN serving as the second pixel electrodes respectively function as first and third pixel electrodes. Pixel electrodes RedN related to the red display and pixel electrodes GreenN related to the green display among pixel electrodes GreenN, BlueN and RedN are directly connected to the signal lines via TFTs. Further, pixel electrode BlueN related to the blue display is indirectly connected to the signal line via pixel electrode GreenN or RedN lying directly below the row of pixel electrodes BlueN. With the connection structure of the display pixels as shown in FIG. 5, the number of signal lines can be reduced to two thirds of the number of display pixels of one row.

Figure 6:
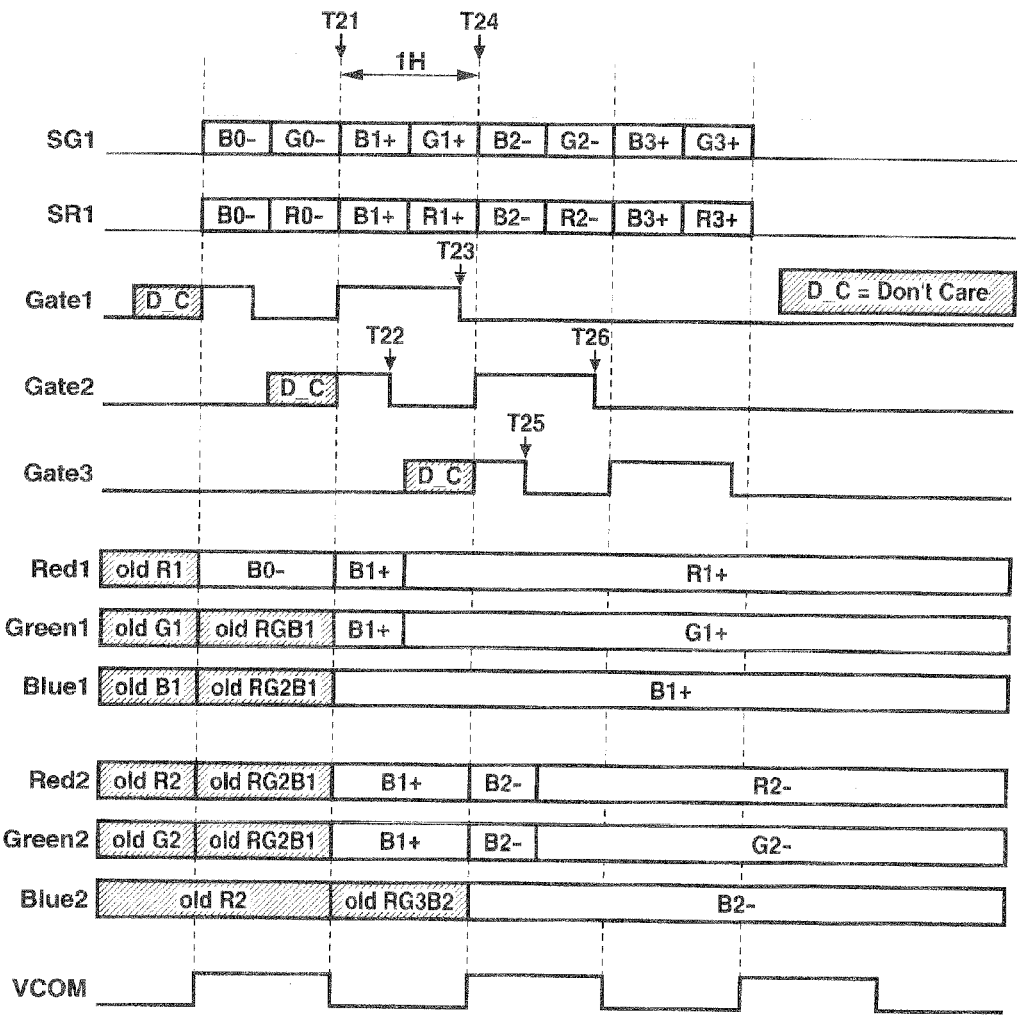
FIG. 6 is a timing chart for illustrating the display operation of the display device in the second embodiment of this invention.

Next, the operation of the display device according to this embodiment is explained. FIG. 6 is a timing chart for illustrating the display operation of the display device in this embodiment. Also, in FIG. 6, a grayscale signal supplied to signal line SG1, a grayscale signal supplied to signal line SR1, a scanning signal supplied to scanning line Gate1, a scanning signal supplied to scanning line Gate2, a scanning signal supplied to scanning line Gate3, a voltage-application state in pixel electrode Red1, voltage-application state in pixel electrode Green1, a voltage-application state in pixel electrode Blue1, a voltage-application state in pixel electrode Red2, a voltage-application state in pixel electrode Green2, a voltage-application state in pixel electrode Blue2 and common voltage VCOM supplied to the opposite electrode are shown in this order from the top.

In this embodiment, image data is input to a signal-line drive circuit 200 for each half horizontal period (H) in an order of blue, green, blue, green, . . . for signal lines SGN that are signal lines 18 of odd-numbered columns. Further, image data is input to the signal-line drive circuit 200 for each half horizontal period (H) in an order of blue, red, blue, red, . . . for signal lines SRN that are signal lines 18 of even-numbered columns. The bit value of image data is inverted for each horizontal period. Also, in FIG. 6, a symbol of "+" is appended to a grayscale signal obtained when the bit inversion of image data is not made and a symbol of "−" is appended to a grayscale signal obtained when the bit inversion of image data is made. As shown in FIG. 6, the polarity of common voltage VCOM is also inverted for each horizontal period along with inversion of the polarity of the grayscale signal.

As described above, as shown in FIG. 6, grayscale signals B0−, G0−, B1+, G1+, B2−, G2−, B3+, . . . are supplied to signal line SG1 and grayscale signals B0−, R0−, B1+, R1+, B2−, R2−, B3+, . . . are supplied to signal line SR1. In this case, B0−, G0− and R0− indicate grayscale signals to be supplied to pixel electrodes connected to a scanning line on an upper row with respect to scanning line Gate1. In this embodiment, it is unnecessary to input a dummy grayscale signal. Further, if scanning line Gate1 is the first (for example, uppermost) row configuring the display panel 100, a grayscale signal may be supplied to signal line SG1 starting from B1+ and a grayscale signal may be supplied to signal line SR1 starting from B1+.

In the following explanation, a display in display pixels corresponding to pixel electrodes Green1, Blue1 and Red1 connected to scanning line Gate1 and pixel electrodes Green2, Blue2 and Red2 connected to scanning line Gate2 is explained. The same control operation as that explained below is performed for the pixel electrodes of the other rows. The explanation for a display in periods corresponding to grayscale signals R0, G0 and B0 shown in FIG. 6 is omitted since the display in the above periods relates to a display on an upper row with respect to scanning line Gate1.

In this embodiment, a scanning signal supplied to each scanning line is set to gate-on level VGH twice in each vertical period (each frame). First, a scanning signal supplied to scanning line Gate1 and a scanning signal supplied to scanning line Gate2 are set at gate-on level VGH for preset periods, respectively. The period in which the scanning signal supplied to scanning line Gate1 is kept set at gate-on level VGH is set to a period from the time when supply of grayscale signal B1+ corresponding to display pixel Blue1 has started to the time immediately before supply of grayscale signal G1+ is ended. Further, the period in which the scanning signal supplied to scanning line Gate2 is kept set at gate-on level VGH is set to a period from the time when supply of grayscale signal B1+ corresponding to display pixel Blue1 has started to the time immediately before supply of grayscale signal B1+ is ended. The periods in which the scanning signals supplied to scanning lines Gate1 and Gate2 are kept set at gate-on level VCH may start from the times a half horizontal period earlier than the above times. In FIG. 6, the period is indicated by D_C.

TFT1*a*, TFT2*a*, TFT3*a* and TFT4*a* are turned on by setting the scanning signal supplied to scanning line Gate1 to gate-on level VGH at time T21. Further, TFT1*b*, TFT2*b*, TFT3*b* and TFT4*b* are turned on by setting the scanning signal supplied to scanning line Gate2 to gate-on level VGH at time T22. As a result, grayscale signal B1+ supplied to signal line SG1 is written in pixel electrode Green1 and grayscale signal B1+ supplied to signal line SR1 is written in pixel electrode Red1. Thus, a display corresponding to grayscale signal B1+ is made in the display pixels 16 corresponding to pixel electrodes Green1 and Red1. Further, grayscale signal B1+ supplied to signal line SG1 is written in pixel electrode Green2 via TFT1*b* and grayscale signal B1+ supplied to signal line SR1 is written in pixel electrode Red2 via TFT4*b*.

In this case, TFT2*a* and TFT3*a* are set in the on state to make conductive a path between pixel electrodes Green2 and Blue1 and a path between pixel electrodes Red2 and Blue1. Further, the same grayscale signal B1+ is written in pixel electrodes Green2 and Red2. Therefore, the potential of pixel electrode Blue1 is set to a potential corresponding to grayscale signal B1+ that is the same potential as that of pixel electrodes Green2 and Red2. Each grayscale signal to be written is grayscale signal B1+ corresponding to pixel electrode Blue1, but the actual display is made via a color filter. Therefore, even if grayscale signal B1+ is written, a green display is made in the display pixel 16 corresponding to pixel electrode Green1 and a red display is made in the display pixel 16 corresponding to pixel electrode Red1. The detailed explanation is made later, but the voltage-application states of pixel electrodes Green1 and Red1 become an adequate state a half horizontal period after the start of the write operation of grayscale signal B1+. Therefore, there occurs no substantial problem in display in the display pixels corresponding to the above pixel electrodes.

In this case, since the scanning signal supplied to scanning line Gate2 is kept at gate-on level VGH, a path between pixel electrodes Green3 and Blue2 is made conductive via TFT2*b* and a path between pixel electrodes Red3 and Blue2 is made conductive via TFT3*b*. Therefore, the voltage level of pixel electrode Blue2 is averaged together with voltages (voltages stored in the auxiliary capacitors) applied to pixel electrodes Green3, Blue2 and Red3 in the preceding frame. In FIG. 6, the averaged voltage is shown as oldRG3B2. Further, in FIG. 6, other portions indicated by "old" are related to displays in the preceding frame.

When the scanning signal of scanning line Gate2 becomes gate-off level VGL at time T22 while the scanning signal supplied to scanning line Gate1 is kept at gate-on level VGH, grayscale signal G1+ supplied to signal line SG1 is written in pixel electrode Green1 via TFT1*a* and grayscale signal R1+ supplied to signal line SR1 is written in pixel electrode Red1 via TFT4*a*. Even when the scanning signal supplied to scanning line Gate1 is kept set at gate-on level VGH, the scanning signal supplied to scanning line Gate2 is set to gate-off level VGL to turn off TFT1*b* and TFT4*b*. Therefore, the potential of pixel electrode Blue1 is set to the same potential of pixel electrodes Green2 and Red2, that is, a potential corresponding to grayscale signal B1+. By the above operation, the write state of grayscale signal B1+ corresponding to pixel electrode Blue1 in pixel electrode Green1 is canceled and an adequate display is made in the display pixel 16 corresponding to pixel electrode Green1. Likewise, the write state of grayscale signal B1+ corresponding to pixel electrode Blue1 in pixel electrode Red1 is canceled and an adequate display is made in the display pixel 16 corresponding to pixel electrode Red1.

When the scanning signal supplied to scanning line Gate1 becomes gate-off level VGL at time T23, voltages of pixel electrodes Green1, Blue1 and Red1 are kept held in the auxiliary capacitors until the TFTs connected to pixel electrodes Green1, Blue1 and Red1 are turned on again.

In the next horizontal period, the scanning signal supplied to scanning line Gate2 and a scanning signal supplied to scanning line Gate3 are set at gate-on level VGH for respective periods. The period in which the scanning signal supplied to scanning line Gate2 is kept at gate-on level VGH is set to a period from the time when supply of grayscale signal B2− corresponding to pixel electrode Blue2 has started to the time immediately before supply of grayscale signal G2− corresponding to pixel electrode Green2 and grayscale signal R2− corresponding to pixel electrode Red2 is ended. Further, the period in which the scanning signal supplied to scanning line Gate3 is kept at gate-on level VGH is set to a period from the time when supply of grayscale signal B2− corresponding to pixel electrode Blue2 has started to the time immediately before supply of grayscale signal B2− is ended.

When the scanning signal supplied to scanning line Gate2 becomes gate-on level VGH at time T24, TFT1*b*, TFT2*b*, TFT3*b* and TFT4*b* are turned on as described before. Further, when the scanning signal supplied to scanning line Gate3 becomes gate-on level VGH at time 124, TFT1*c*, TFT2*c*, TFT3*c* and TFT4*c* are turned on. As a result, grayscale signal B2− supplied to signal line SG1 is written in pixel electrodes Green2 and Green3 and grayscale signal B2− supplied to signal line SR1 is written in pixel electrodes Red2 and Red3.

Further, a path between pixel electrodes Green3 and Blue2 and a path between pixel electrodes Red1 and Blue2 are made conductive to set the potential of pixel electrode Blue2 to the same potential of pixel electrodes Green3 and Red3, that is, a potential corresponding to grayscale signal B2−. Thus, a display corresponding to grayscale signal B2− that corresponds to pixel electrode Blue2 is made in the display pixels 16 corresponding to pixel electrodes Green2, Blue2 and Red2.

When the scanning signal supplied to scanning line Gate3 becomes gate-off level VGL at time T25 while the scanning signal supplied to scanning line Gate2 is kept at gate-on level VGH, grayscale signal G2− corresponding to pixel electrode Green2 and supplied to signal line SG1 is written in pixel electrode Green2. As a result, the write state of grayscale signal B2− corresponding to pixel electrode Blue2 in pixel electrode Green2 is canceled and an adequate display is made in the display pixel 16 corresponding to pixel electrode Green2. Likewise, grayscale signal R2− corresponding to pixel electrode Red2 and supplied to signal line SR1 is written in pixel electrode Red2. As a result, the write state of grayscale signal B2− corresponding to pixel electrode Blue2 in pixel electrode Red2 is canceled and an adequate display is made in the display pixel 16 corresponding to pixel electrode Red2. At this time, the potential of pixel electrode Blue2 is kept at the same potential of pixel electrodes Green3 and Red3, that is, a potential corresponding to grayscale signal B2−.

When the scanning signal supplied to scanning line Gate2 becomes gate-off level VGL at time T26, voltages of pixel electrodes Green2, Blue2 and Red2 are kept held in the auxiliary capacitors until the TFTs connected to pixel electrodes Green2, Blue2 and Red2 are turned on again.

In the succeeding horizontal period, the same control operation as described above is performed and am adequate grayscale display is made based on the image signal in the respective display pixels.

As described above, in this embodiment, pixel electrode RedN related to the red display and pixel electrode GreenN related to the green display are directly connected to the signal lines via the respective TFTs. Further, pixel electrode BlueN related to the blue display is indirectly connected to the signal line via pixel electrode RedN or GreenN. With the above connection structure of the display pixels, the number of signal lines can be reduced to two thirds of the number of display pixels of one row.

Further, in this embodiment, as shown in FIG. 5, two TFTs and one pixel electrode are provided between pixel electrode BlueN and the signal line. In this embodiment, grayscale signals are written into pixel electrode BlueN via both of two signal lines arranged to sandwich pixel electrode BlueN. Therefore, a period until the operation of writing a grayscale signal at a desired level into pixel electrode BlueN is completed can be reduced by reducing the time constant of pixel electrode BlueN.

Further, in the first embodiment, an adequate display of the display pixel 16 corresponding to pixel electrode GreenN and the display pixel 16 corresponding to pixel electrode RedN is made with a delay of one horizontal period with respect to a display of the display pixel 16 corresponding to pixel electrode BlueN. On the other hand, in the second embodiment, an adequate display of the display pixel 16 corresponding to pixel electrode GreenN and the display pixel 16 corresponding to pixel electrode RedN is made with a delay of a half horizontal period with respect to a display of the display pixel 16 corresponding to pixel electrode BlueN. Thus, in the second embodiment, an adequate grayscale signal can be written in the pixel electrode and displayed at higher speed in comparison with the first embodiment.

In the above embodiments, the display panel 100 is driven by the line-inversion drive operation of inverting the polarity (the magnitude relationship between the grayscale signal and common voltage) of voltage VLCD applied to the pixel electrode for each horizontal period. If the bit value of display data and the polarity of common voltage VCOM are inverted for each frame, the display panel 100 can be driven by a frame-inversion drive operation.

Further, in FIGS. 3 and 5, pixel electrodes Green1, Blue1 and Red1 are arranged in this order in positions corresponding to the interconnections between scanning lines Gate1, Gate2 and signal lines SG1, SR1. Pixel electrode Green1 is connected to signal line SG1 via TFT1a. Pixel electrode Red1 is connected to signal line SR1 via TFT4a. Pixel electrode Blue1 is connected to pixel electrode Green1 via TFT2a and connected to pixel electrode Red2 via TFT3a. The order of colors of color filters is not limited to this order.

However, since the visibility of blue with respect to human eyes is weak in comparison with that of green and red, it is desirable to display blue with a correct grayscale signal at an earlier time in comparison with green and red.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
a first scanning line arranged to extend in a preset direction;
a second scanning line arranged to extend in the preset direction;
a first signal line arranged to intersect with the first and second scanning lines;
a second signal line arranged to intersect with the first and second scanning lines;
a first thin-film transistor comprising a gate electrode connected to the second scanning line and one of source and drain electrodes connected to the first signal line;
a first pixel electrode connected to the other one of the source and drain electrodes of the first thin-film transistor;
a second thin-film transistor comprising a gate electrode connected to the first scanning line and one of source and drain electrodes connected to the first pixel electrode;
a second pixel electrode connected to the other one of the source and drain electrodes of the second thin-film transistor;
a third thin-film transistor comprising a gate electrode connected to the first scanning line and one of source and drain electrodes connected to the second pixel electrode;
a third pixel electrode connected to the other one of the source and drain electrodes of the third thin-film transistor;
a fourth thin-film transistor comprising a gate electrode connected to the second scanning line, one of source and drain electrodes connected to the third pixel electrode, and the other one of the source and drain electrodes connected to the second signal line; and
a drive circuit supplying (i) a grayscale signal to be held in the first pixel electrode to the first pixel electrode via the first signal line and the first thin-film transistor, (ii) a grayscale signal to be held in the third pixel electrode to the third pixel electrode via the second signal line and the fourth thin-film transistor, (iii) a grayscale signal to be held in the second pixel electrode to the second pixel electrode via the first signal line, the first thin-film transistor, the first pixel electrode, and the second thin-film transistor in this order, and (iv) a grayscale signal to be held in the second pixel electrode to the second pixel electrode via the second signal line, the fourth thin-film transistor, the third pixel electrode, and the third thin-film transistor in this order.

2. The display device according to claim 1, wherein the first, second and third pixel electrodes are arranged to be disposed between the first and second scanning lines and to extend in the preset direction.

3. The display device according to claim 2, wherein the drive circuit comprises:
a signal-line drive circuit configured to supply the grayscale signal to be held in the first pixel electrode to the first signal line and to supply the grayscale signal to be held in the third pixel electrode to the second signal line after the grayscale signals to be held in the second pixel electrode are supplied to the first and second signal lines; and
a scanning-line drive circuit configured to (i) supply a scanning signal that turns on each of the first and fourth thin-film transistors to the second scanning line and supply a scanning signal that turns on each of the second and third thin-film transistors to the first scanning line when the signal-line drive circuit supplies the grayscale signals to be held in the second pixel electrode to the first and second signal lines, and (ii) supply a scanning signal that turns on each of the first and fourth thin-film transistors to the second scanning line and supply a scanning signal that turns off each of the second and third thin-film transistors to the first scanning line when the signal-line drive circuit supplies the grayscale signal to be held in the first pixel electrode to the first signal line and supplies the grayscale signal to be held in the third pixel electrode to the second signal line.

4. The display device according to claim 3, wherein the signal-line drive circuit supplies the grayscale signals to be respectively held in the first and third pixel electrodes with a delay of 1.5 horizontal period with respect to the grayscale signals to be held in the second pixel electrode.

5. The display device according to claim 1, wherein the first, second and third pixel electrodes correspond to color components that are different from one another.

6. The display device according to claim 5, wherein the second pixel electrode corresponds to a blue component.

7. The display device according to claim 1, wherein the first, second and third pixel electrodes are arranged between the first and second signal lines.

8. The display device according to claim 1, wherein the first, second and third pixel electrodes are arranged as pixel electrodes on different pixel columns.

9. The display device according to claim 8, wherein the first, second and third pixel electrodes are arranged as pixel electrodes on the same pixel row.

10. The display device according to claim 1, wherein the second pixel electrode is arranged between the first and third pixel electrodes.

11. The display device according to claim 1, wherein grayscale signals respectively corresponding to green and blue components are time-divisionally supplied to the first signal line and grayscale signals respectively corresponding to red and blue components are time-divisionally supplied to the second signal line.

12. The display device according to claim 11, wherein the grayscale signals respectively corresponding to the green and red components are supplied to the first and second signal lines at the same timing.

13. The display device according to claim 1, wherein the second pixel electrode is arranged between the first and second scanning lines, and the first and third pixel electrodes are arranged such that the second scanning line is disposed between the second pixel electrode and the first and third pixel electrodes.

14. The display device according to claim 13, wherein the drive circuit comprises:
a signal-line drive circuit configured to supply the grayscale signal to be held in the first pixel electrode to the first signal line and to supply the grayscale signal to be held in the third pixel electrode to the second signal line after the grayscale signals to be held in the second pixel electrode are supplied to the first and second signal lines; and
a scanning-line drive circuit configured (i) to supply a scanning signal that turns on each of the first and fourth thin-film transistors to the second scanning line and supply a scanning signal that turns on each of the second and third thin-film transistors to the first scanning line when the signal-line drive circuit supplies the grayscale signals to be held in the second pixel electrode to the first and second signal lines, and (ii) supply a scanning signal that turns on each of the first and fourth thin-film transistors to the second scanning line and supply a scanning signal that turns off each of the second and third thin-film transistors to the first scanning line when the signal-line drive circuit supplies the grayscale signal to be held in the first pixel electrode to the first signal line and supplies the grayscale signal to be held in the third pixel electrode to the second signal line.

15. The display device according to claim 14, wherein the signal-line drive circuit supplies the grayscale signals to be respectively held in the first and third pixel electrodes with a delay of a half horizontal period with respect to the grayscale signal to be held in the second pixel electrode.

16. The display device according to claim 1, wherein the first and third pixel electrodes are arranged as pixel electrodes on a pixel row different from a pixel row of the second pixel electrode.

17. The display device according to claim 16, wherein the first and third pixel electrodes are arranged as pixel electrodes on the same pixel row.

18. The display device according to claim 1, wherein a fourth pixel electrode different from the second pixel electrode is arranged between the first and third pixel electrodes.

* * * * *